(12) United States Patent  (10) Patent No.: US 8,340,874 B2
Lee  (45) Date of Patent: Dec. 25, 2012

(54) CONSTRUCTION EQUIPMENT INCLUDING REAR VIEW CAMERA

(75) Inventor: Chun Han Lee, Gimhae-si (KR)

(73) Assignee: Volvo Construction Equipment Holding Sweden AB, Eskilstuna (SE)

( * ) Notice: Subject to any disclaimer, the term of this patent is extended or adjusted under 35 U.S.C. 154(b) by 347 days.

(21) Appl. No.: 12/702,766

(22) Filed: Feb. 9, 2010

(65) Prior Publication Data

US 2010/0204873 A1     Aug. 12, 2010

(30) Foreign Application Priority Data

Feb. 12, 2009   (KR) ........................ 10-2009-0011523

(51) Int. Cl.
*G06F 7/70* (2006.01)

(52) U.S. Cl. .......................... 701/50; 348/118; 348/148

(58) Field of Classification Search ................ 701/50; 348/118–120, 148; 172/430; 371/443
See application file for complete search history.

(56) References Cited

U.S. PATENT DOCUMENTS

| 6,820,356 B2 * | 11/2004 | Naruse et al. .................... 37/348 |
| 7,466,337 B2 * | 12/2008 | Sawada et al. ................ 348/148 |
| 7,637,039 B2 * | 12/2009 | Toda et al. ....................... 37/348 |
| 2005/0151845 A1 * | 7/2005 | Tsukada et al. ............... 348/148 |

\* cited by examiner

*Primary Examiner* — Michael McCullough
(74) *Attorney, Agent, or Firm* — Ladas & Parry LLP

(57) ABSTRACT

Construction equipment including a hydraulic pump driven by an engine, a lower driving structure, an upper swing structure swingably mounted on the lower driving structure, a working device mounted on the upper swing structure and having a boom, an arm, and a bucket respectively driven by a hydraulic cylinder is disclosed. The construction equipment comprises a rear view camera to permit a driver to view rearward traffic conditions.

11 Claims, 3 Drawing Sheets

CONSTRUCTION EQUIPMENT INCLUDING REAR VIEW CAMERA

CROSS-REFERENCE TO RELATED APPLICATION

This application is based on and claims priority to Korean Patent Application No. 10-2009-11523, filed on Feb. 12, 2009, in the Korean Intellectual Property Office, the disclosure of which is incorporated herein in its entirety by reference.

FIELD OF THE DISCLOSURE

The present disclosure relates to a construction equipment, and more particularly, to construction equipment including a rear view camera to permit a driver to view rearward traffic conditions.

BACKGROUND OF THE DISCLOSURE

FIG. 1 shows a hydraulic excavator including a rear view camera according to a related art. The excavator includes a lower driving structure 1; an upper swing structure 2 swingably mounted on the lower driving structure 1; a cabin 3 and an engine 4 mounted on the upper swing structure 2; a working device 11 mounted on the upper swing structure 2 and having a boom 8 driven by a boom cylinder 5, an arm 9 driven by an arm cylinder 6, and a bucket 10 driven by a bucket cylinder 7; a counterweight 12 mounted on a rear side of the upper swing structure 2; and a rear view camera 13 installed a rear surface of the counterweight 12 and displaying a taken image on a monitor placed in the cabin 3.

With the hydraulic excavator including the rear view camera, a changeover switch for displaying the image taken by the rear view camera is installed, and the changeover switch is turned by a driver. In this instance, since the changeover switch is placed apart from a manipulation unit for operating the equipment, the driver experiences inconvenience in operating the changeover switch during driving.

In addition, in the case where the rear view camera is installed at the rear surface of the counterweight, since the rear view camera is placed at a relatively high position, it is not sufficient to monitor obstacles positioned on the ground around the construction equipment. As a result, the lower driving structure comes in contact with the obstacle, or is trapped in the obstacles, which makes the safety driving in trouble.

In particular, in the case where the image of the obstacle taken by the rear view camera is displayed on the monitor, it is difficult for the driver to check the actual distance between the construction equipment and the obstacle, which deteriorates practical use.

SUMMARY OF THE DISCLOSURE

Accordingly, the present disclosure has been made to solve the above-mentioned problems occurring in the prior art while advantages achieved by the prior art are maintained intact.

One object of the present disclosure is to provide construction equipment including a rear view camera to permit a driver to view rearward traffic conditions by displaying a rear image taken by the rear view camera on a monitor installed in a cabin, thereby enhancing driving safety.

Another object of the present disclosure is to provide construction equipment including a rear view camera to permit a driver to turn off an image provided from the rear view camera on a monitor, without manipulating a changeover switch, thereby enhancing driving convenience.

In order to accomplish these objects, there is provided construction equipment including a hydraulic pump driven by an engine, a lower driving structure, an upper swing structure swingably mounted on the lower driving structure, a working device mounted on the upper swing structure and having a boom, an arm and a bucket respectively driven by each hydraulic cylinder, the construction equipment including: a rear view camera installed on a predetermined rear position on the upper swing structure and photographing rearward and lateral sides of the construction equipment in real time; a monitor provided in a cabin mounted on the upper swing structure to display an image output from the rear view camera; a driving detecting unit for detecting driving of the hydraulic pump to output a detected signal; a control unit for displaying the image output from the rear view camera on the monitor when pressure of working oil of the hydraulic pump is more than a set reference pressure; and an image turning-off means for turning off the image displayed on the monitor when a working condition is changed by a driver.

In a preferred embodiment, the driving detecting unit of the hydraulic pump includes a pressure sensor installed in an outlet flow passage of the hydraulic pump and detecting the pressure of the working oil to transmit an electric signal corresponding to the pressure to the control unit.

In a preferred embodiment, the driving detecting unit of the hydraulic pump includes an inclined-angle detecting sensor for detecting an inclined angle of a swash plate of the hydraulic pump to transmit an electric signal corresponding to the inclined angle to the control unit.

In a preferred embodiment, the driving detecting unit of the hydraulic pump includes a sensor for detecting a current value applied to an electronic proportional control valve which controls a pump regulator adjusting the inclined angle of the swash plate so as to control a discharge amount of the hydraulic pump, and the sensor transmits an electric signal corresponding to the current value to the control unit.

In a preferred embodiment, the driving detecting unit of the hydraulic pump includes an engine-revolution detecting sensor for detecting a load variation of the engine to transmit an electric signal corresponding to the control unit.

The image turning-off means turns off the image output from the rear view camera displayed on the monitor in the case where a manipulation signal for operating the working device is input.

In a preferred embodiment, if a manipulation signal for operating the working device is input or a manipulation signal for operating the swing device to swing the upper swing structure with respect to the lower driving structure is input, the image output from the rear view camera is turned off the monitor.

With the above description, the construction equipment including the rear view camera according to a preferred embodiment of the present disclosure includes the following advantages.

The image of the rear side of the construction equipment taken by the rear view camera is displayed on the monitor provided in the cabin, thereby ensuring the driving safety.

Further, since the image output from the rear view camera is turned off from the monitor by selection of the driver, a screen can display an image wanted by the driver.

BRIEF DESCRIPTION OF THE DRAWINGS

The above and other objects, features and advantages of the present disclosure will be more apparent from the following detailed description taken in conjunction with the accompanying drawings, in which.

DETAILED DESCRIPTION OF EXEMPLARY EMBODIMENTS

Hereinafter, exemplary embodiments of the present disclosure will be described with reference to the accompanying drawings. The matters defined in the description, such as the detailed construction and elements, are nothing but specific details provided to assist those of ordinary skill in the art in a comprehensive understanding of the present disclosure, and thus the present disclosure is not limited thereto.

Figure 2:
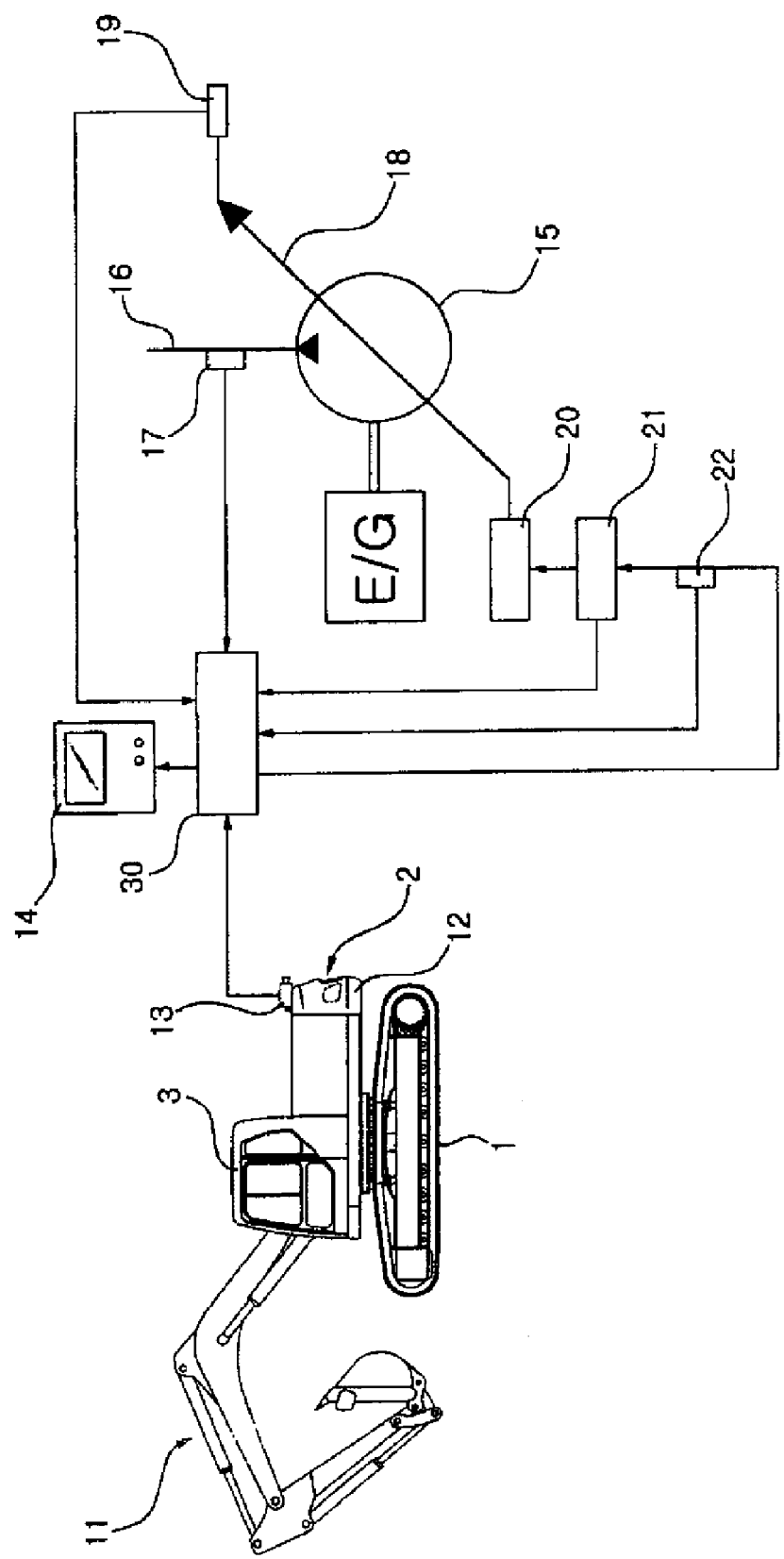
FIG. 2 is a schematic view illustrating a construction equipment including rear view camera according to an embodiment of the present disclosure.
Figure 3:
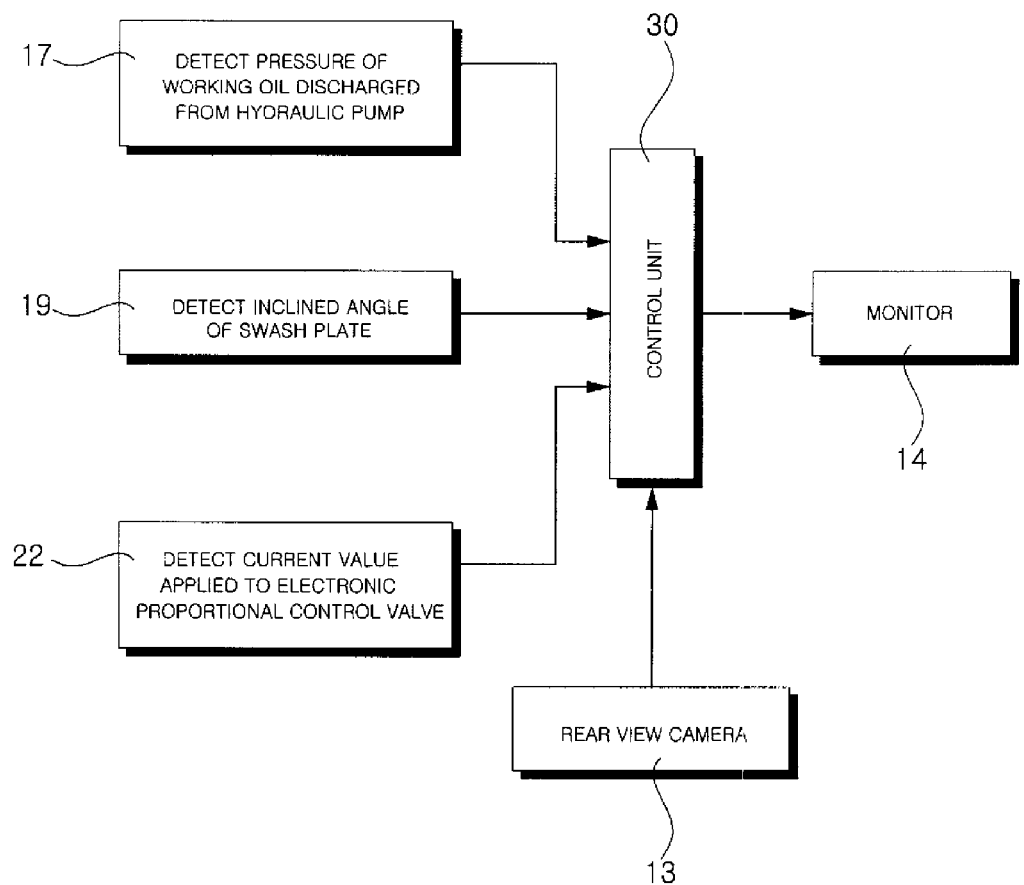
FIG. 3 is a block diagram of a control unit for controlling a construction equipment including rear view camera according to an embodiment of the present disclosure.

FIGS. 2 and 3 are block diagrams illustrating a construction equipment including a rear view camera and a control unit of the rear view camera according to a preferred embodiment of the present disclosure.

The construction equipment includes a variable capacity hydraulic pump (hereinafter, referred to as hydraulic pump) driven by an engine (E/G), a lower driving structure, an upper swing structure swingably mounted on the lower driving structure, a working device mounted on the upper swing structure and having a boom, an arm and a bucket respectively driven by a hydraulic cylinder.

The construction equipment further includes a rear view camera (CCD camera) 13 installed on a counterweight 12 which is mounted at a desired rear position on the upper swing structure 2, driven by a driving unit (not shown), and photographing rearward and lateral conditions of the construction equipment in real time; a monitor 14 provided in a cabin 3, which is mounted on the upper swing structure 2, for displaying the image output from the rear view camera 13; a driving detecting unit for detecting driving of a hydraulic pump 15 to output a detected signal; a control unit 30 for displaying the image output from the rear view camera 13 on the monitor 14 when pressure of working oil of the hydraulic pump 15 is more than a reference pressure; and an image turning-off means for turning off the image displayed on the monitor 14 when a working condition is changed by a driver. In this instance, the expression 'change of the operation condition' means that a manipulation signal for operating the working device is input to the control unit 30 during operation.

The driving detecting unit of the hydraulic pump 15 includes a pressure sensor 17 installed in an outlet flow passage 16 of the hydraulic pump 15 and detecting the pressure of the working oil to transmit an electric signal corresponding to the pressure to the control unit 30.

The driving detecting unit of the hydraulic pump 15 further includes an inclined-angle detecting sensor 19 for detecting an inclined angle of a swash plate 18 of the hydraulic pump 15 to transmit an electric signal corresponding to the inclined angle to the control unit 30.

In addition, the driving detecting unit of the hydraulic pump 15 includes a sensor 22 for detecting a current value applied to an electronic proportional control valve 21 which controls a pump regulator 20 adjusting the inclined angle of the swash plate 18 so as to control a discharge amount of the hydraulic pump 15. The sensor 22 transmits an electric signal corresponding to the current value to the control unit 30.

Alternatively, the driving detecting unit of the hydraulic pump 15 may include an engine-revolution detecting sensor (not shown) for detecting a load variation of the engine to transmit an electric signal corresponding to the control unit 30.

The above-described image turning-off means turns off the image output from the rear view camera displayed on the monitor 14 in the case where a manipulation signal for operating the working device 11 such as the boom is input or a manipulation signal for operating a swing device to swing the upper swing structure 2 with respect to the lower driving structure 1 is input.

Figure 1:
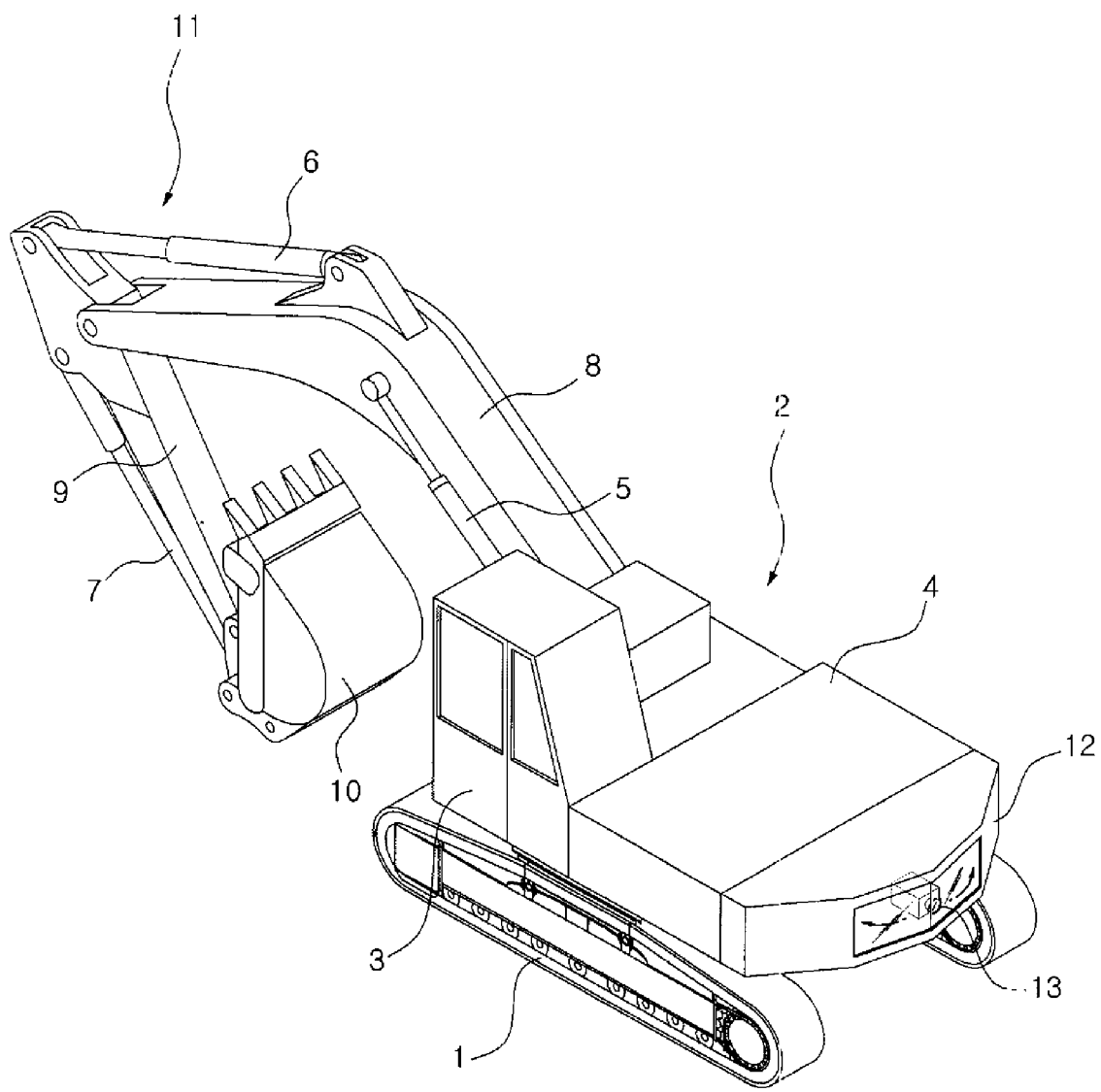
FIG. 1 is a perspective view illustrating a construction equipment including a rear view camera according to a related art.

In this instance, the configuration including the lower driving frame 1, the upper swing structure 2, the cabin 3, the working device 11, the rear view camera 13 and the respective hydraulic cylinders 5, 6 and 7 is substantially similar to that of the excavator shown in FIG. 1, and the depiction thereof in the Prior Art device of FIG. 1 shows how these components would appear in the present invention, in which like parts are designated by the same reference numerals.

Next, the application of the construction equipment including the rear view camera according to the embodiment of the present disclosure will be described with reference to the accompanying drawings.

As shown in FIGS. 2 and 3, the electric signal corresponding to the image (i.e., the obstacle positioned at a rear side of the construction equipment) taken by the rear view camera 13 installed on the counterweight 12 to photography the rearward and lateral conditions of the construction equipment in real time is transmitted to the control unit 30.

The electric signal corresponding to the pressure of the working oil detected by the pressure sensor 17 installed in the outlet flow passage 16 of the hydraulic pump 15 is transmitted to the control unit 30. In this instance, when the pressure of working oil of the hydraulic pump 15 is more than a set reference pressure, the image output from the rear view camera 13 is displayed on the monitor 14 provided in the cabin 3.

As a result, when the construction equipment is driven, a driver in the cabin 3 can easily view an obstacle positioned at a blind spot at the rear side of the construction equipment through the monitor 14 to ensure the driving safety.

As described above, in the case where a working condition is changed by the driver monitoring image displayed on the monitor by the rear view camera in the cabin 3 while the construction equipment is driving, the driver can turn off the image from the rear view camera 13 on the monitor 14.

In the case of changing of the working condition described above, that is, in the case where a manipulation signal for operating the working device 11 such as the boom or the arm is input or a manipulation signal for operating the swing device to swing the upper swing structure 2 with respect to the lower driving structure 1 is input, the image output from the rear view camera 13 is turned off the monitor 14.

Meanwhile, in the case where the pressure of the working oil of the hydraulic pump 15 is lower than the set reference pressure, an equipment state is displayed on the monitor 14. In this instance, the equipment state means a working state of the devices mounted in the construction equipment, such as various instruments or gauge for displaying temperature of the working oil or temperature of cooling water.

If the inclined angle of the swash plate 18 detected by the inclined-angle detecting sensor 19 is more than a set inclined angle, the image output from the rear view camera 13 can be displayed on the monitor 14 in the cabin 3.

In addition, if the electric value applied to the electronic proportional control valve 21 which controls the pump regulator 20 adjusting the inclined angle of the swash plate 18 so as to control the discharge amount of the hydraulic pump 15 is more than a reference current value, the image output from the rear view camera 13 can be displayed on the monitor 14 in the cabin 3.

Although preferred embodiments of the present disclosure have been described for illustrative purposes, those skilled in the art will appreciate that various modifications, additions and substitutions are possible, without departing from the scope and spirit of the present disclosure as disclosed in the accompanying claims.

The invention claimed is:

1. A construction equipment including a hydraulic pump driven by an engine, a lower driving structure, an upper swing structure swingably mounted on the lower driving structure, a working device mounted on the upper swing structure and having a boom, an arm and a bucket each respectively driven by a hydraulic cylinder, the construction equipment comprising:
 a rear view camera installed on a predetermined rear position on the upper swing structure and photographing rearward and lateral sides of the construction equipment in real time;
 a monitor provided in a cabin mounted on the upper swing structure to display an image output from the rear view camera;
 a driving detecting unit for detecting driving of the hydraulic pump to output a detected signal, the driving detecting unit comprising a sensor for detecting when pressure of working oil of the hydraulic pump is more than a set reference pressure;
 a control unit for displaying the image output from the rear view camera on the monitor when pressure of the working oil of the hydraulic pump is more than a the set reference pressure; and
 an image turning-off means for turning off the image displayed on the monitor when a working condition is changed by a driver;
 wherein the driving detecting unit of the hydraulic pump includes a second sensor for detecting a current value applied to an electronic proportional control valve which controls a pump regulator adjusting an inclined angle of a swash plate so as to control a discharge amount of the hydraulic pump, and the second sensor transmits an electric signal corresponding to the current value to the control unit.

2. The construction equipment according to claim 1, wherein the driving detecting unit of the hydraulic pump includes a pressure sensor installed in an outlet flow passage of the hydraulic pump and detecting the pressure of the working oil to transmit an electric signal corresponding to the pressure to the control unit.

3. The construction equipment according to claim 1, wherein the driving detecting unit of the hydraulic pump includes an inclined-angle detecting sensor for detecting an inclined angle of a swash plate of the hydraulic pump to transmit an electric signal corresponding to the inclined angle to the control unit.

4. The construction equipment according to claim 3, wherein the image turning-off means turns off the image output from the rear view camera displayed on the monitor in the case where a manipulation signal for operating the working device is input.

5. The construction equipment according to claim 3, wherein if a manipulation signal for operating the working device is input or a manipulation signal for operating the swing device to swing the upper swing structure with respect to the lower driving structure is input, the image output from the rear view camera is turned off the monitor.

6. A construction equipment including a hydraulic pump driven by an engine, a lower driving structure, an upper swing structure swingably mounted on the lower driving structure, a working device mounted on the upper swing structure and having a boom, an arm and a bucket each respectively driven by a hydraulic cylinder, the construction equipment comprising:
 a rear view camera installed on a predetermined rear position on the upper swing structure and photographing rearward and lateral sides of the construction equipment in real time;
 a monitor provided in a cabin mounted on the upper swing structure to display an image output from the rear view camera;
 a driving detecting unit for detecting driving of the hydraulic pump to output a detected signal, the driving detecting unit comprising a sensor for detecting when pressure of working oil of the hydraulic pump is more than a set reference pressure;
 a control unit for displaying the image output from the rear view camera on the monitor when pressure of the working oil of the hydraulic pump is more than the set reference pressure; and
 an image turning-off means for turning off the image displayed on the monitor when a working condition of the construction equipment is changed by a driver without a need for the driver to manipulate a dedicated switch to turn off the displayed image.

7. The construction equipment according to claim 6, wherein the driving detecting unit of the hydraulic pump includes a pressure sensor installed in an outlet flow passage of the hydraulic pump and detecting the pressure of the working oil to transmit an electric signal corresponding to the pressure to the control unit.

8. The construction equipment according to claim 6, wherein the driving detecting unit of the hydraulic pump includes an inclined-angle detecting sensor for detecting an inclined angle of a swash plate of the hydraulic pump to transmit an electric signal corresponding to the inclined angle to the control unit.

9. The construction equipment according to claim 6, wherein the driving detecting unit of the hydraulic pump includes an inclined-angle detecting sensor for detecting a current value applied to an electronic proportional control valve which controls a pump regulator adjusting an inclined angle of the swash plate so as to control a discharge amount of the hydraulic pump, and the sensor transmits an electric signal corresponding to the current value to the control unit.

10. The construction equipment according to claim 6, wherein the image turning-off means turns off the image output from the rear view camera displayed on the monitor in the case where a manipulation signal for operating the working device is input.

11. The construction equipment according to claim 6, wherein if a manipulation signal for operating the working device is input or a manipulation signal for operating the swing device to swing the upper swing structure with respect to the lower driving structure is input, the image output from the rear view camera is turned off the monitor.

* * * * *